(12) United States Patent
Salmela et al.

(10) Patent No.: US 10,645,569 B2
(45) Date of Patent: May 5, 2020

(54) REMOTE PROVISION OF A SUBSCRIBER DEVICE

(71) Applicant: Telefonaktiebolaget LM Ericsson (publ), Stockholm (SE)

(72) Inventors: Patrik Salmela, Espoo (FI); Abu Shohel Ahmed, Espoo (FI); Kazi Wali Ullah, Espoo (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/312,892

(22) PCT Filed: Jun. 27, 2016

(86) PCT No.: PCT/EP2016/064846
§ 371 (c)(1),
(2) Date: Dec. 21, 2018

(87) PCT Pub. No.: WO2018/001449
PCT Pub. Date: Jan. 4, 2018

(65) Prior Publication Data
US 2019/0253874 A1    Aug. 15, 2019

(51) Int. Cl.
*H04W 8/20* (2009.01)
*H04W 8/18* (2009.01)
(Continued)

(52) U.S. Cl.
CPC ............ *H04W 8/205* (2013.01); *H04W 8/18* (2013.01); *H04W 60/00* (2013.01); *H04W 4/60* (2018.02)

(58) Field of Classification Search
CPC ........ H04W 8/205; H04W 60/00; H04W 4/60
See application file for complete search history.

(56) References Cited

U.S. PATENT DOCUMENTS

| 9,948,641 | B2 | 4/2018 | Ahrens et al. | |
|---|---|---|---|---|
| 2005/0239450 | A1* | 10/2005 | Wesby | H04M 1/05 455/418 |

(Continued)

FOREIGN PATENT DOCUMENTS

| DE | 10 2014 014 078 A1 | 3/2016 |
|---|---|---|
| GB | 2522044 A | 7/2015 |

OTHER PUBLICATIONS

GSM Association, "RSP Technical Specification", Official Document SGP.22, Version 1.0 (Jan. 13, 2016). (114 pages).
(Continued)

*Primary Examiner* — Nizar N Sivji
(74) *Attorney, Agent, or Firm* — Sage Patent Group

(57) ABSTRACT

There is provided mechanisms for remote provision of a secondary subscriber entity. A method is performed by a primary subscriber entity. The method comprises providing a selected subscription type for the secondary subscriber entity to a subscription portal of the primary subscriber entity during an authenticated session between the primary subscriber entity and the subscription portal. The method comprises receiving an activation code for a new network subscription of the selected subscription type from the subscription portal. The method comprises providing the activation code to the secondary subscriber entity to remotely provision the secondary subscriber entity.

16 Claims, 6 Drawing Sheets

(51) Int. Cl.
*H04W 60/00* (2009.01)
*H04W 4/60* (2018.01)

(56) References Cited

U.S. PATENT DOCUMENTS

2015/0350881 A1* 12/2015 Weiss .................... H04W 8/205
                                                          455/558
2016/0330608 A1* 11/2016 Benn ..................... H04W 8/183
2017/0295172 A1* 10/2017 Ahrens .................. H04W 8/14

OTHER PUBLICATIONS

GSM Association, "RSP Technical Specification", Official Document SGP.22, Version 1.1 (Jun. 9, 2016). (125 pages).
GSM Association, "RSP Architecture", Official Document SGP.21, Version 1.0 (Dec. 23, 2015). (52 pages).
International Search Report and Written Opinion dated Mar. 15, 2017 issued in International Application No. PCT/ EP2016/064846. (16 pages).
European Communication dated Oct. 1, 2019 issued in European Patent Application No. 16741873 (11 pages).

\* cited by examiner

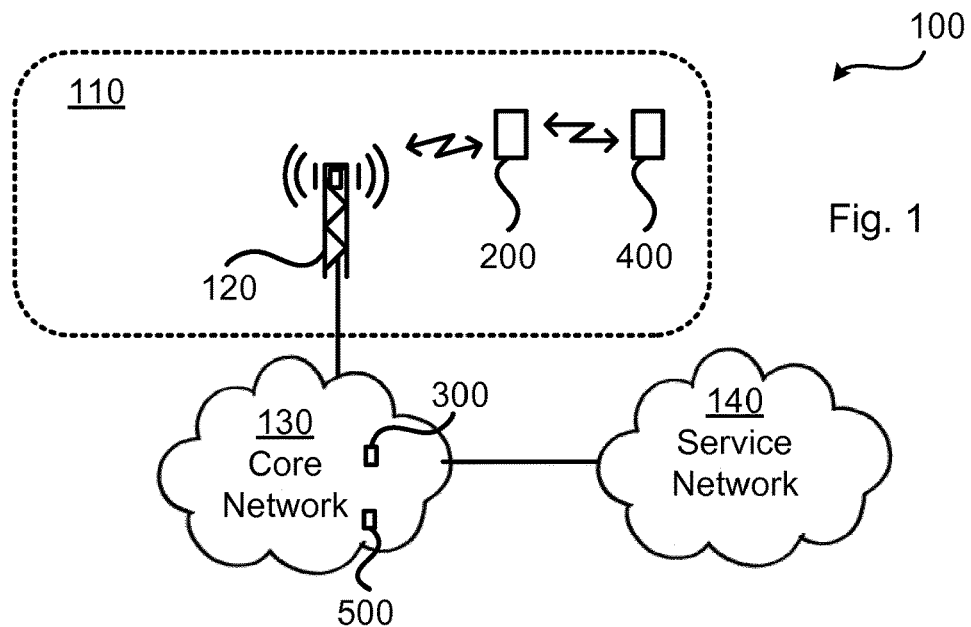
Fig. 1
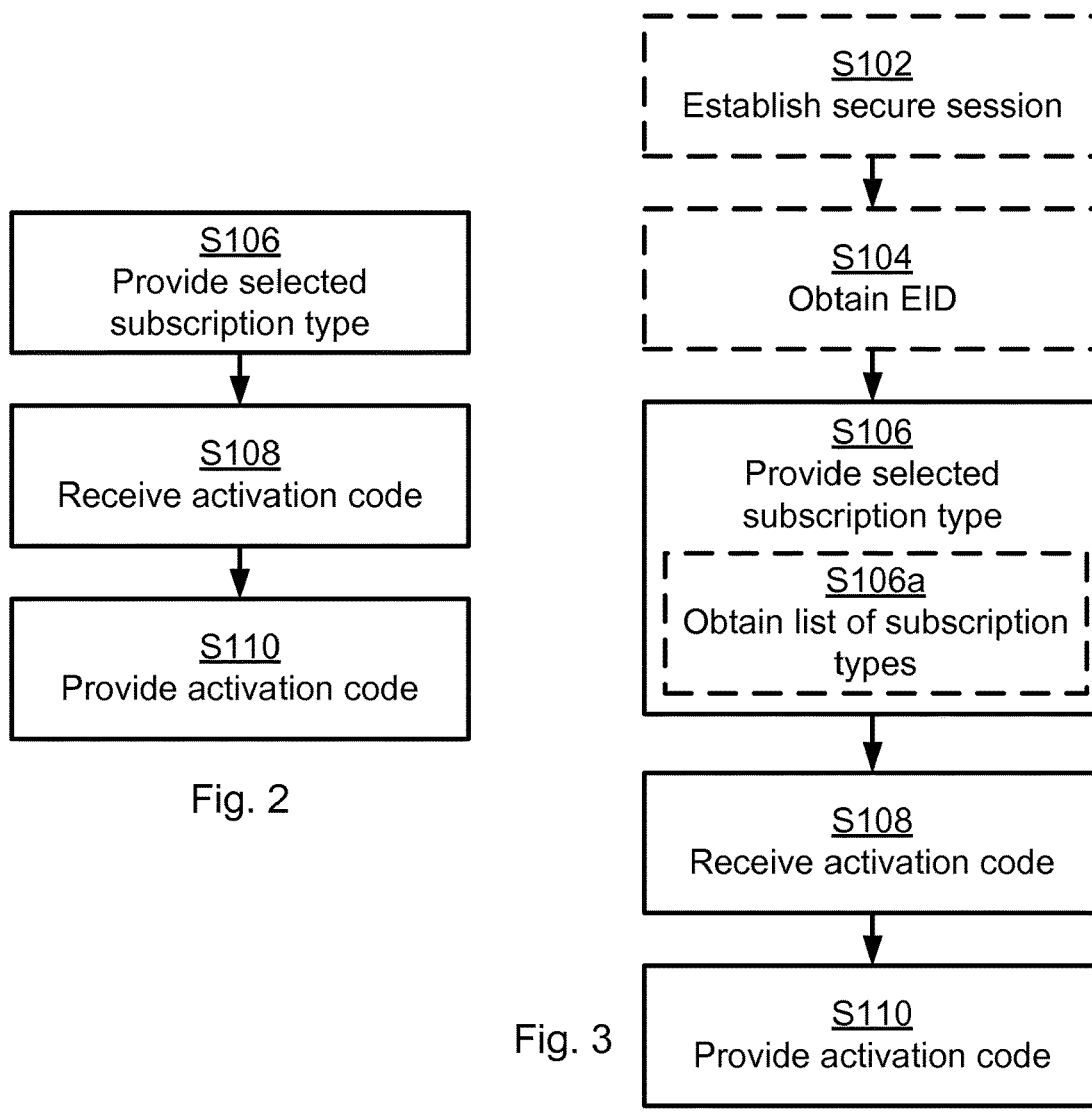
Fig. 2
Fig. 3

REMOTE PROVISION OF A SUBSCRIBER DEVICE

CROSS REFERENCE TO RELATED APPLICATION(S)

This application is a 35 U.S.C. § 371 National Stage of International Patent Application No. PCT/EP2016/064846, filed Jun. 27, 2016, designating the United States.

TECHNICAL FIELD

Embodiments presented herein relate to a method, a primary subscriber entity, a computer program, and a computer program product for remote provision of a secondary subscriber entity. Further embodiments presented herein relate to a method, a subscription portal, a computer program, and a computer program product for remote provision of the secondary subscriber entity. Further embodiments presented herein relate to a method, a secondary subscriber entity, a computer program, and a computer program product for remote provision of the secondary subscriber entity.

BACKGROUND

Mobile networks are being used to connect all sorts of devices; automated reading of utility meters, intelligent connectivity of cars and commercial vehicles to enable drivers to access navigation, infotainment or breakdown services, traffic lights, home security and assisted living.

A subscriber identity module or subscriber identification module (SIM) is an integrated circuit chip that is intended to securely store the international mobile subscriber identity (IMSI) number and its related key, which are used to identify and authenticate subscriptions on the devices. The SIM circuit is part of the function of a Universal Integrated Circuit Card (UICC) physical smart card. Traditional SIM cards are predicated on only associating with one network operator.

The GSM Association (GSMA), where GSM is short for Global System for Mobile communications, has released a technical specification denoted SGP.22—RSP defining remote SIM provisioning for consumer devices and a technical specification denoted SGP.02 disclosing a remote provisioning architecture for Embedded UICC (eUICC), which targets machine-to-machine (M2M) type communications devices. In short, the operator uses an entity called SM-DP+/SM-DP (short for Subscription Management—Data Preparation) for creation of SIM profiles that are later installed from the SM-DP/SM-DP+ to the eUICC. For the consumer devices, the profile is installed through a Local Profile Assistant (LPA) on the consumer device to the Issuer Security Domain Profile (ISD-P) on the eUICC in the device. For the M2M devices, the SM-DP installs the profile via a separate (external) entity, SM-SR, to the ISD-P on the device.

Both above mentioned variants have the device owner obtaining a subscription for the device from the operator by providing the operator with relevant information about the device to be provisioned, optionally including eUICC ID (EID) and International Mobile Station Equipment Identity (IMEI). The subscription can be obtained from a point of sales, via a web page of the operator, or other similar methods. Section 3.1 in SGP.22 describes the profile download initiation process. It shows how the user orders a subscription from the operator, and how the operator asks the SM-DP+ to generate the matching profile. Then the operator provides the user with an activation code (AC) that the user can insert into/provide to the device to be provisioned. The device can extract the relevant information (SM-DP+ reachability information, etc.) from the activation code and then proceed to contact the SM-DP+ for downloading the profile based on the AC after mutual authentication and various security functions.

The process of ordering the subscription/profile from the operator comprises the user to provide billing information and optionally the EID, and/or the IMEI. Billing information implies providing identification and authentication of the user as well as possibly providing other billing related information such as the address and a credit card number of the user.

According to the above, the user will have to provide the billing information each time a subscription for a new device is added. However, if the user deploys multiple devices at the same time the operator can potentially provide an interface from which the user can order multiple subscriptions with one set of billing information. Regardless if the devices are added one by one, or many at a time, the user optionally also has to provide the device information for each device to the operator. The benefit of providing this information is that the operator can verify the type of device and verify that there is a profile type that is suitable to it. If a web form is used, the user enters the EID and IMEI codes into the appropriate fields. Already for one device, this can seem cumbersome as the EID and IMEI are quite long strings/numbers that need to be entered manually.

Hence, there is still a need for improved mechanisms for remote provision of devices.

SUMMARY

An object of embodiments herein is to provide efficient remote provision of devices.

According to a first aspect there is presented a method for remote provision of a secondary subscriber entity. The method is performed by a primary subscriber entity. The method comprises providing a selected subscription type for the secondary subscriber entity to a subscription portal of the primary subscriber entity during an authenticated session between the primary subscriber entity and the subscription portal. The method comprises receiving an activation code for a new network subscription of the selected subscription type from the subscription portal. The method comprises providing the activation code to the secondary subscriber entity to remotely provision the secondary subscriber entity.

According to a second aspect there is presented a primary subscriber entity for remote provision of a secondary subscriber entity. The primary subscriber entity comprises processing circuitry. The processing circuitry is configured to cause the primary subscriber entity to provide a selected subscription type for the secondary subscriber entity to a subscription portal of the primary subscriber entity during an authenticated session between the primary subscriber entity and the subscription portal. The processing circuitry is configured to cause the primary subscriber entity to receive an activation code for a new network subscription of the selected subscription type from the subscription portal. The processing circuitry is configured to cause the primary subscriber entity to provide the activation code to the secondary subscriber entity to remotely provision the secondary subscriber entity.

According to a third aspect there is presented a primary subscriber entity for remote provision of a secondary subscriber entity. The primary subscriber entity comprises a provide module configured to provide a selected subscription type for the secondary subscriber entity to a subscription portal of the primary subscriber entity during an authenticated session between the primary subscriber entity and the subscription portal. The primary subscriber entity comprises a receive module configured to receive an activation code for a new network subscription of the selected subscription type from the subscription portal. The primary subscriber entity comprises a provide module configured to provide the activation code to the secondary subscriber entity to remotely provision the secondary subscriber entity.

According to a fourth aspect there is presented a computer program for remote provision of a secondary subscriber entity, the computer program comprising computer program code which, when run on processing circuitry of a primary subscriber entity, causes the primary subscriber entity to perform a method according to the first aspect.

According to a fifth aspect there is presented a method for remote provision of a secondary subscriber entity. The method is performed by a subscription portal. The method comprises obtaining a selected subscription type for the secondary subscriber entity from a primary subscriber entity during an authenticated session between the primary subscriber entity and the subscription portal. The method comprises providing an activation code for a new network subscription of the selected subscription type to the primary subscriber entity to remotely provision the secondary subscriber entity.

According to a sixth aspect there is presented a subscription portal for remote provision of a secondary subscriber entity. The subscription portal comprises processing circuitry. The processing circuitry is configured to cause the subscription portal to obtain a selected subscription type for the secondary subscriber entity from a primary subscriber entity during an authenticated session between the primary subscriber entity and the subscription portal. The processing circuitry is configured to cause the subscription portal to provide an activation code for a new network subscription of the selected subscription type to the primary subscriber entity to remotely provision the secondary subscriber entity.

According to a seventh aspect there is presented a subscription portal for remote provision of a secondary subscriber entity. The subscription portal comprises an obtain module configured to obtain a selected subscription type for the secondary subscriber entity from a primary subscriber entity during an authenticated session between the primary subscriber entity and the subscription portal. The subscription portal comprises a provide module configured to provide an activation code for a new network subscription of the selected subscription type to the primary subscriber entity to remotely provision the secondary subscriber entity.

According to an eighth aspect there is presented a computer program for remote provision of a secondary subscriber entity, the computer program comprising computer program code which, when run on processing circuitry of a subscription portal, causes the subscription portal to perform a method according to the fifth aspect.

According to a ninth aspect there is presented a method for remote provision of a secondary subscriber entity. The method is performed by the secondary subscriber entity. The method comprises obtaining an activation code for a new network subscription of a selected subscription type from a primary subscriber entity to remotely provision the secondary subscriber entity, wherein the primary subscriber entity has an existing network subscription of a first subscription type with a network operator of a subscription portal, and wherein the selected subscription type is based on said first subscription type.

According to a tenth aspect there is presented a secondary subscriber entity for remote provision of the secondary subscriber entity. The secondary subscriber entity comprises processing circuitry. The processing circuitry is configured to cause the secondary subscriber entity to obtain an activation code for a new network subscription of a selected subscription type from a primary subscriber entity to remotely provision the secondary subscriber entity, wherein the primary subscriber entity has an existing network subscription of a first subscription type with a network operator of a subscription portal, and wherein the selected subscription type is based on said first subscription type.

According to an eleventh aspect there is presented a secondary subscriber entity for remote provision of the secondary subscriber entity. The secondary subscriber entity comprises an obtain module configured to obtain an activation code for a new network subscription of a selected subscription type from a primary subscriber entity to remotely provision the secondary subscriber entity, wherein the primary subscriber entity has an existing network subscription of a first subscription type with a network operator of a subscription portal, and wherein the selected subscription type is based on said first subscription type.

According to a twelfth aspect there is presented a computer program for remote provision of a secondary subscriber entity, the computer program comprising computer program code which, when run on processing circuitry of the secondary subscriber entity, causes the secondary subscriber entity to perform a method according to the ninth aspect.

According to a thirteenth aspect there is presented a computer program product comprising a computer program according to at least one of the fourth aspect, the eighth aspect, and the twelfth aspect and a computer readable storage medium on which the computer program is stored. The computer readable storage medium can be a non-transitory computer readable storage medium.

Advantageously these methods, these primary subscriber entities, these subscription portals, these secondary subscriber entities, and these computer programs provide efficient remote provision of the secondary subscriber entity.

Since the selected subscription type is provided from the primary subscriber entity to the subscription portal of the primary subscriber entity during an authenticated session between the primary subscriber entity and the subscription portal, advantageously therefore, these methods, these primary subscriber entities, these subscription portals, these secondary subscriber entities, and these computer programs enable secure remote provision of the secondary subscriber entity.

Advantageously these methods, these primary subscriber entities, these subscription portals, these secondary subscriber entities, and these computer programs enable efficient provision especially when a plurality, say in the order of 100 or more, of secondary subscriber entities are to be provisioned.

Advantageously these methods, these primary subscriber entities, these subscription portals, these secondary subscriber entities, and these computer programs enable efficient subscription ordering and binding to a billable entity without the need to explicitly authenticate the owner of the device to be provisioned (i.e., the secondary subscriber entity).

It is to be noted that any feature of the first, second, third, fourth, fifth, sixth seventh, eight, ninth, tenth, eleventh, twelfth, and thirteen aspects may be applied to any other aspect, wherever appropriate. Likewise, any advantage of the first aspect may equally apply to the second, third, fourth, fifth, sixth, seventh, eight, ninth, tenth, eleventh twelfth, and/or thirteenth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 1 is a schematic diagram illustrating a communication network according to embodiments;

FIGS. 2, 3, 4, 5, 6, and 7 are flowcharts of methods according to embodiments.

DETAILED DESCRIPTION

Figure 4:
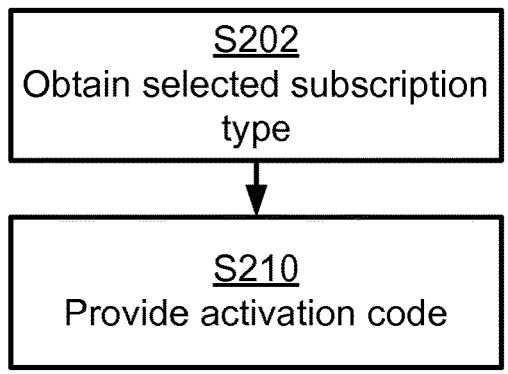

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

FIG. 1 is a schematic simplified diagram of a communications network 100 where embodiments presented herein can be applied. The communications network 100 comprises a radio access network 110 (defined by a radio access network node 120, such as a radio base station), a core network 130, and a packet based service network 140. The core network 130 operatively connects the radio access network 110 with the packet based service network 140.

A primary subscriber entity 200 operatively connected to the service network 140 for example via the radio access network 110, for example via radio access network node 120, or via some other wireless or wired access, is enabled to access services and exchange data with the service network 140.

A secondary subscriber entity 400 is to be provisioned by a subscription portal 300 and a subscription management entity 500. In some embodiments the subscription management entity 500 is an SM-DP+ entity. In order for the secondary subscriber entity 400 to be provisioned by the subscription portal 300 and the subscription management entity 500 an operative connection is established between the secondary subscriber entity 400 and the primary subscriber entity 200. The secondary subscriber entity 400 is denoted secondary since it uses a trusted connection between the primary subscriber entity 200 and the subscription portal 300 for the remote provision of the secondary subscriber entity 400. In this respect the secondary subscriber entity 400 could also be referred to as a companion device. A description of the operations performed in order to remotely provision the secondary subscriber entity 400 will be provided below.

The primary subscriber entity 200 and/or the secondary subscriber entity 400 could be a SIM or an eSIM. In this respect, SIM or eSIM may refer not only to a module but to the device comprising the SIM or eSIM. Further, the primary subscriber entity 200 and/or the secondary subscriber entity 400 could be a communications device. Preferably the secondary subscriber entity 400 is an eSIM or an eSIM device.

As the skilled person understands, although the schematic illustration of FIG. 1 only depicts network entities in the form of one radio access network 110, one core network 130, and one service network 140, the communications network 100 generally comprises a plurality such network entities.

The herein disclosed embodiments are based on using a device already having a network subscription as the primary device (as defined by the primary subscriber entity 200) for provisioning the new profile to a secondary device (as defined by the secondary subscriber entity 400) for provision the secondary device with a subscription to the same network operator that provides the network subscription of the primary device.

The embodiments disclosed herein thus relate to mechanisms for remote provision of the secondary subscriber entity 400. In order to obtain such mechanisms there is provided a primary subscriber entity 200, a method performed by the primary subscriber entity 200, a computer program product comprising code, for example in the form of a computer program, that when run on processing circuitry of the primary subscriber entity 200, causes the primary subscriber entity 200 to perform the method. In order to obtain such mechanisms there is further provided a subscription portal 300, a method performed by the subscription portal 300, and a computer program product comprising code, for example in the form of a computer program, that when run on processing circuitry of the subscription portal 300, causes the subscription portal 300 to perform the method. In order to obtain such mechanisms there is further provided a secondary subscriber entity 400, a method performed by the secondary subscriber entity 400, and a computer program product comprising code, for example in the form of a computer program, that when run on processing circuitry of the secondary subscriber entity 400, causes the secondary subscriber entity 400 to perform the method.

Figure 5:
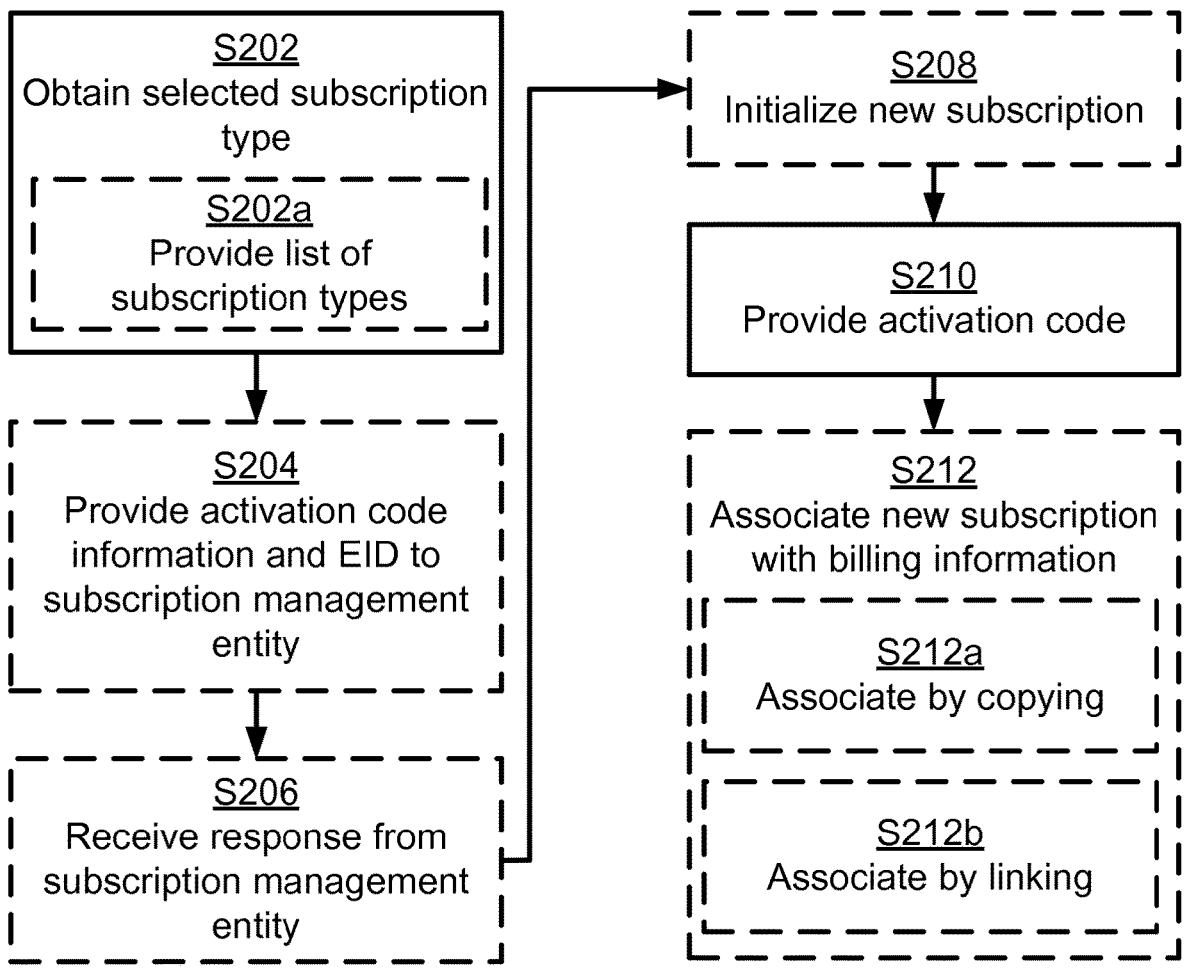
Figure 6:
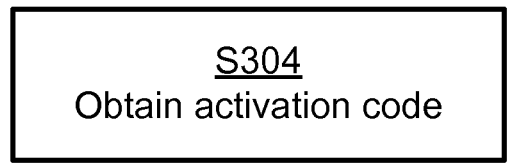

FIGS. 2 and 3 are flow charts illustrating embodiments of methods for remote provision of the secondary subscriber entity 400 as performed by the primary subscriber entity 200. FIGS. 4 and 5 are flow charts illustrating embodiments of methods for remote provision of the secondary subscriber entity 400 as performed by the subscription portal 300. FIG. 6 is a flow chart illustrating an embodiment of a method for remote provision of the secondary subscriber entity 400 as performed by the secondary subscriber entity 400. The methods are advantageously provided as computer programs.

Reference is now made to FIG. 2 illustrating a method for remote provision of the secondary subscriber entity 400 as performed by the primary subscriber entity 200 according to an embodiment.

S106: The primary subscriber entity 200 provides a selected subscription type for the secondary subscriber entity 400 to a subscription portal 300 of the primary subscriber entity 200. That is, the primary subscriber entity 200 already has a network subscription with a network operator managing the subscription portal 200. The selected subscription type is provided to the subscription portal 300 during an authenticated session between the primary subscriber entity 200 and the subscription portal 300. In general terms, the authenticated session is based on subscription credentials for the primary subscriber entity 200, i.e., where the primary subscriber entity 200 authenticates itself to the subscription portal 300 with its subscription credentials so that the subscription portal 300 has access to relevant information about the network subscription of the primary subscriber entity 200. Hence, according to an embodiment the primary subscriber entity 200 has an existing network subscription of a first subscription type with a network operator of the subscription portal 300. As will be disclosed below, this enables the subscription portal 300, for example, to copy or link the billing information of the primary subscriber entity 200 and determine limitations with respect to what types of subscriptions can be provided to the secondary subscriber entity 400. Alternatively the authentication using the subscription credentials is performed through the otherwise established secure session.

S108: The primary subscriber entity 200 receives an activation code for a new network subscription of the selected subscription type from the subscription portal 300.

S110: The primary subscriber entity 200 provides the activation code to the secondary subscriber entity 400 to remotely provision the secondary subscriber entity 200. In this respect the secondary subscriber entity 400 is thus provisioned with a subscription.

This provides an efficient process of providing a subscription for the secondary subscriber entity 400 that relies on an existing subscription of the primary subscriber entity 200. The subscription of the secondary subscriber entity 400 will thereby be bound to the subscription of the primary subscriber entity 200, which, additionally, makes it possible to issue one bill covering both subscriptions.

Embodiments relating to further details of remote provision of the secondary subscriber entity 400 as performed by the primary subscriber entity 200 will now be disclosed.

Reference is now made to FIG. 3 illustrating methods for remote provision of the secondary subscriber entity 400 as performed by the primary subscriber entity 200 according to further embodiments. It is assumed that steps S106, S108, and S110 are performed as disclosed above with reference to FIG. 2 and a thus repeated description thereof is therefore omitted.

According to an embodiment the primary subscriber entity 200 obtains the EID from the secondary subscriber entity 400. Hence, according to an embodiment the primary subscriber entity 200 is configured to perform step S104:

S104: The primary subscriber entity 200 obtains an Embedded Universal Integrated Circuit Card Identity (EID) from the secondary subscriber entity 400. The EID is then provided to the subscription portal 300, for example prior to the selected subscription part.

There could be different ways for the primary subscriber entity 200 to obtain the EID from the secondary subscriber entity 400. According to an embodiment the EID is by the primary subscriber entity 200 obtained during a pairing process with the secondary subscriber entity 400. The pairing process could be part of an authenticated session between the primary subscriber entity 200 and the secondary subscriber entity 400. Hence, according to an embodiment the primary subscriber entity 200 is configured to perform step S102:

S102: The primary subscriber entity 200 establishes a further secure session. The further secure session is by the primary subscriber entity 200 established with the secondary subscriber entity 400 and is established before the primary subscriber entity 200 obtains the EID from the secondary subscriber entity 400. The EID is obtained during this further secure session.

According to some aspects step S102 is performed prior to step S104.

There may be different ways to select the subscription type. According to some aspects the subscription type is selected from a list of possible subscriptions. Hence, according to an embodiment the primary subscriber entity 200 is configured to perform step S106 as part of step S106:

S106a: The primary subscriber entity 200 obtains a list of subscription types from the subscription portal 300 in response to having provided the EID. The selected subscription type is selected from this list of subscription types.

According to an embodiment the list of subscription types is based on the existing network subscription (i.e., the network subscription of the primary subscriber entity 200). For example, the new network subscription is to the network operator of the existing network subscription. Additionally, the subscription of the the secondary subscriber entity 400 could be based on properties of the subscription of the primary subscriber entity 200, such as lowest cost, lowest data rate, a default subscription, etc. Hence, according to an embodiment the list of subscription types is based on a subscription policy of the existing network subscription. That is, the subscription policy could dictate whether the subscription should be based on lowest cost, lowest data rate, a default subscription, etc. Additionally or alternatively, also the device type, identified by EID or IMEI, (when available) could dictate what type of subscriptions are available for the secondary subscriber entity 400.

In some embodiments the primary subscriber entity 200 does not obtain the EID of the secondary subscriber entity 400 and in such embodiments step S104 is thus not performed as disclosed above. In such embodiments the primary subscriber entity 200 could define the EID of the secondary subscriber entity 400 as "unknown" or provide an empty string as the EID of the secondary subscriber entity 400 in an alternative step S104. Hence, the primary subscriber entity 200 could in step S106a obtain the list of subscription types from the subscription portal 300 in response to having provided the EID as "unknown" or as an empty string to the subscription portal 300.

Reference is now made to FIG. 4 illustrating a method for remote provision of the secondary subscriber entity 400 as performed by the subscription portal 300 according to an embodiment.

As disclosed above, the primary subscriber entity in step S106 provides the selected subscription type for the secondary subscriber entity 400 to the subscription portal 300. Hence, the subscription portal 300 is configured to perform step S202:

S202: The subscription portal 300 obtains the selected subscription type for the secondary subscriber entity 400 from the primary subscriber entity 200 during an authenticated session between the primary subscriber entity 200 and the subscription portal 300.

In response to having obtained the selected subscription type the subscription portal 300 provides an activation code to the primary subscriber entity 200 and is hence configured to perform step S210:

S210: The subscription portal 300 provides an activation code for a new network subscription of the selected subscription type to the primary subscriber entity 200 to remotely provision the secondary subscriber entity 400.

Embodiments relating to further details of remote provision of the secondary subscriber entity 400 as performed by the subscription portal 300 will now be disclosed.

As disclosed above, according to some embodiments the primary subscriber entity 200 has an existing network subscription of a first subscription type with a network operator of the subscription portal 300. The new network subscription could then be to the network operator of the existing network subscription.

Reference is now made to FIG. 5 illustrating methods for remote provision of the secondary subscriber entity 400 as performed by the subscription portal 300 according to further embodiments. It is assumed that steps S202 and S210 are performed as disclosed above with reference to FIG. 4 and a thus repeated description thereof is therefore omitted.

According to some embodiments the subscription portal 300 obtains the EID of the secondary subscriber entity 400 from the primary subscriber entity 200. Further, as disclosed above, according to some aspects the subscription type is selected from a list of possible subscriptions. Hence, according to an embodiment subscription portal 300 is configured to perform step S202a as part of step S202:

S202a: The subscription portal 300 provides a list of subscription types to the primary subscriber entity 200 in response to having obtained the EID. The selected subscription type is then selected from this list of subscription types. In short, the list of subscription types could be based on EID or device type of the secondary subscriber entity 400, and/or subscription information or device type of the primary subscriber entity 200. Further aspects of which list types to include in the list have been disclosed above. Further, embodiments as disclosed above where the primary subscriber entity 200 does not obtain the EID of the secondary subscriber entity 400 apply equally here.

In order for the subscription portal 300 to provide the activation code to the primary subscriber entity 200 the subscription portal 300 may facilitate creation of a profile by a subscription management entity 500, receive a response from the subscription management entity 500, and initialize the new subscription, and hence be configured to perform steps S204-S206 as disclosed next:

S204: The subscription portal 300 provides the EID (if present) and information of the activation code to the subscription management entity 500 for the subscription management entity 500 to create a profile for the EID. In this respect the EID and the information of the activation code are different entities that do not depend on each other. The activation code information can be either generated by the network operator or the subscription management entity 500. The activation code is provided to the eUICC by the network operator.

S206: The subscription portal 300 receives a response from the subscription management entity 500 when the profile has been created.

S208: The subscription portal 300 initializes the new subscription using the response from the subscription management entity 500 and information of the existing network subscription of the primary subscriber entity 200.

Billing information of the new network subscription can be based on the existing network subscription of the primary subscriber entity 200. Hence, according to an embodiment the subscription portal 300 is configured to perform step S212:

S212: The subscription portal 300 associates the new network subscription with billing information. The association can be performed by either copying or linking billing information of the existing network subscription (of the primary subscriber entity 200) to the new network subscription (of the secondary subscriber entity 400), and hence according to an embodiment the subscription portal 300 is configured to perform either step S212a or step S212b as part of step S212:

S212a: The subscription portal 300 copies billing information of the existing network subscription to the new network subscription.

S212b: The subscription portal 300 links billing information of the existing network subscription to the new network subscription.

Reference is now made to FIG. 6 illustrating a method for remote provision of the secondary subscriber entity 400 as performed by the secondary subscriber entity 400 according to an embodiment.

As disclosed above, the primary subscriber entity 200 in step S110 provides an activation code for a new network subscription to remotely provision the secondary subscriber entity 400. Hence, the secondary subscriber entity 400 is configured to perform step S304:

S304: The secondary subscriber entity 400 obtains the activation code for the new network subscription of the selected subscription type from the primary subscriber entity 200 to remotely provision the secondary subscriber entity 400. As disclosed above, the primary subscriber entity 200 has an existing network subscription of a first subscription type with a network operator of the subscription portal 300, and the selected subscription type is based on this first subscription type. In other words, the selected subscription for the secondary subscriber entity 400 is based on the existing subscription for the primary subscriber entity 200. Also, the subscription type for the new subscription can (in addition to the device type of the secondary subscriber entity 400) be based on the subscription type of the existing subscription.

Figure 7:
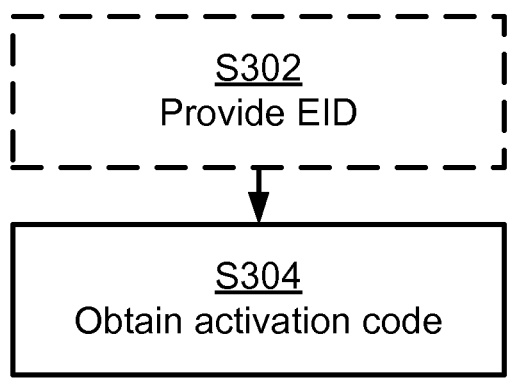

Reference is now made to FIG. 7 illustrating methods for remote provision of the secondary subscriber entity 400 as performed by the secondary subscriber entity 400 according to further embodiments. It is assumed that step S304 is performed as disclosed above with reference to FIG. 6 and a thus repeated description thereof is therefore omitted.

As disclosed above, according to an embodiment the primary subscriber entity 200 obtains the EID from the secondary subscriber entity 400. Hence, according to an embodiment the secondary subscriber entity 400 is configured to perform step S302:

S302: The secondary subscriber entity 400 provides the EID of the secondary subscriber entity 400 to the primary subscriber entity 200. This EID is by the primary subscriber entity 200 obtained as in step S104.

Embodiments as disclosed above with reference to the primary subscriber entity 200 and the subscription portal 300 also apply to the secondary subscriber entity 400.

Hence, as an example the secondary subscriber entity 400 is optionally configured to establish an authenticated session with the primary subscriber entity 200 before the EID is provided to the primary subscriber entity 200.

Figure 8:
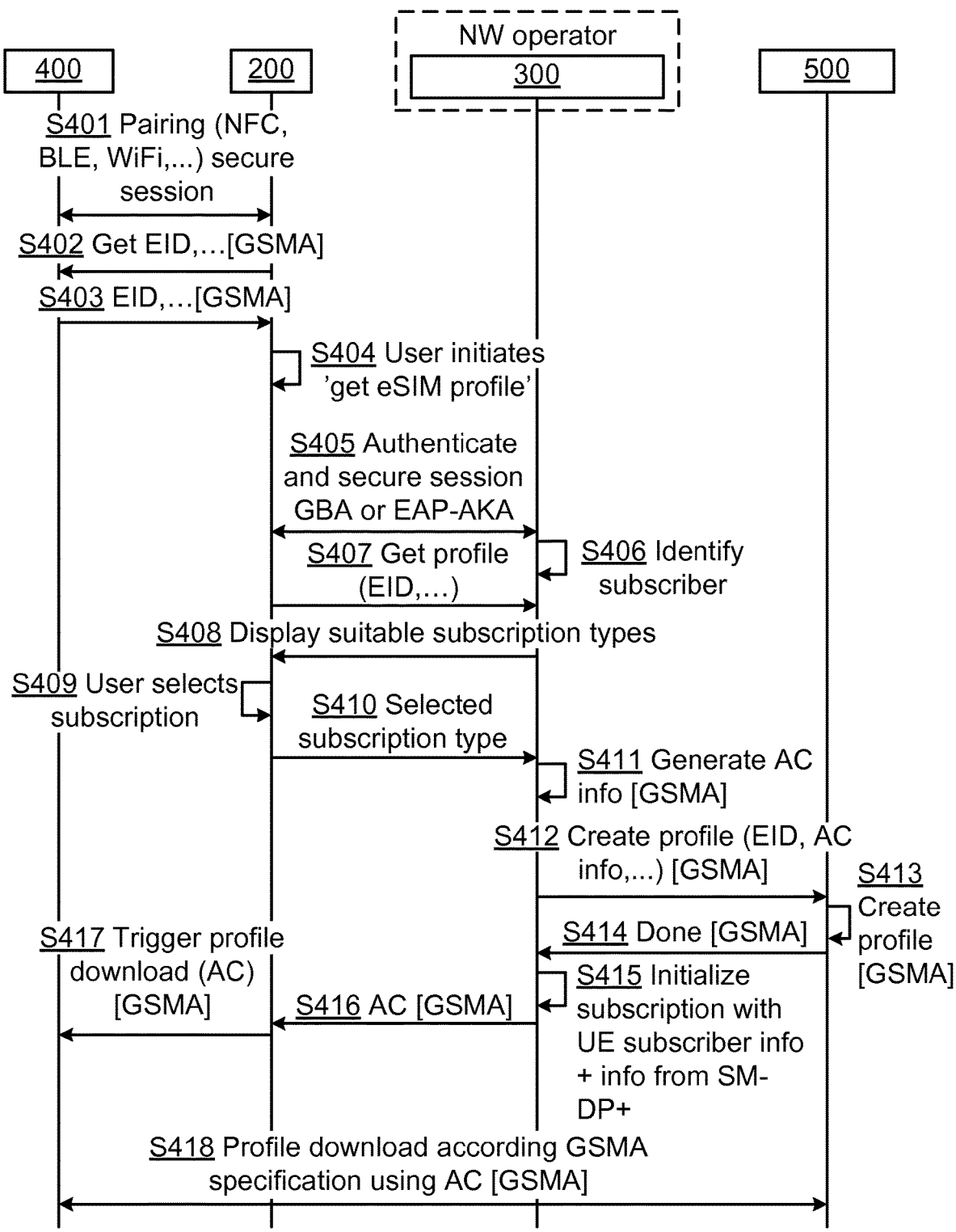
FIG. 8 is a signalling diagram according to embodiments

One particular embodiment for remote provision of the secondary subscriber entity 400 based on at least some of the above disclosed embodiments will now be disclosed in detail with reference to the signal diagram of FIG. 8. Steps that follow the above referenced GSMA documents are marked with [GSMA].

This embodiment is based on the EID of the secondary subscriber entity 400 initially being provided to the primary subscriber entity 200. Details of an embodiment where this is not the case will be disclosed below. This embodiment is further based on the network operator providing a subscription portal 300, and where the secondary subscriber entity 400 causes the primary subscriber entity 200 to establish a connection with the subscription portal 300, either via a dedicated application run on the secondary subscriber entity 400 or using e.g. a web browser. Establishing the connection between the primary subscriber entity 200 and the secondary subscriber entity 400 comprises pairing of an authenticated session (such as using near-field communications; NFC, Bluetooth low energy; BLE, or WiFi); step S401 "Pairing (NFC, BLE, WiFI, . . . ) secure session". In this respect, a user may thus use the primary subscriber entity 200 for provisioning the secondary subscriber entity 400. The primary subscriber entity 200, either via a dedicated application or web page, runs the subscription process with the subscription portal 300. The primary subscriber entity 200 and the secondary subscriber entity 400 are paired (before running the dedicated application, or as a result of it, alternatively, before or after accessing the web page), and the primary subscriber entity 200 queries the EID (explicitly, or running the dedicated application or using the web page) of the secondary subscriber entity 400 (or queries/requests/requires) the user to input the EID. The primary subscriber entity 200 thus obtains the EID of the secondary subscriber entity 400 from the secondary subscriber entity 400 by requesting the EID; step S402 "Get EID, . . . [GSMA]" and by receiving the EID; step S403 "EID, . . . [GSMA]". The user then requests the secondary subscriber entity 400 to be provisioned; step S404 "User initiates 'get eSIM profile'".

The primary subscriber entity 200 authenticates itself to the subscription portal 300 using, for example, 3GPP subscription credentials, e.g. using Extensible Authentication Protocol Method for Universal Mobile Telecommunications System (UMTS) Authentication and Key Agreement (EAP-AKA) or Extensible Authentication Protocol Method for SIM (EAP-SIM) for 2G) or Generic Bootstrapping Architecture (GBA); step S405 "Authenticate and secure session GBA or EAP-AKA". The resulting session keys are used for protecting the communication between the primary subscriber entity 200 and the subscription portal 300. The subscription portal 300 is thereby enabled to identify the network subscription of the primary subscriber entity 200; step S406 "Identify subscriber". As the primary subscriber entity 200 thereby is authenticated to the subscription portal 300 using the subscription credentials the subscription portal 300 can receive the subscription information, including billing information, or at least have access to operator internal services for querying and/or modifying this information. This means that the subscription portal 300 can automatically obtain authentication and billing information of the user of the primary subscriber entity 200 without any explicit user interaction relating to the authentication and billing information.

Once authenticated, the primary subscriber entity 200 can provide the EID and other relevant information about the secondary subscriber entity 400 to the subscription portal 300; step S407 "Get profile (EID, . . . )". This information can be entered by the user or the primary subscriber entity 200 can query it from the attached secondary subscriber entity 400, for example in step S402. The information is communicated to the subscription portal 300 together with a request for a subscription (e.g., an eSIM profile) for the identified secondary subscriber entity 400.

The subscription portal 300 can provide a selection of different types of subscriptions available for the secondary subscriber entity 400; step S408 "Display suitable subscription types". As stated in the above referred GSMA documents, the network operator can, based on the EID or IMEI, identify what type of device is in question, or the type of subscription used by the primary subscriber entity 200. Based on this information, the subscription portal 300 can limit the provided subscriptions to those that make sense to that type of device (if applicable). The user can study the details of the subscriptions via the primary subscriber entity 200 and then select the type of subscription; step S409 "User selects subscription" and step S410 "Selected subscription type". The selection triggers the subscription portal 300 in the operator network to contact the subscription management entity 500 requesting a new profile to be created.

The provisioning of the profile can then follow the specification defined by the above referred GSMA documents. Hence, steps S411-418 are performed. The subscription portal 300 generates activation code (AC) information; S411 "Generate AC info [GSMA]". The subscription portal 300 requests the subscription management entity 500 to create a profile by providing at least the AC information and the EID to the subscription management entity 500; S412 "Create profile (EID, AC info, . . . ) [GSMA]". The subscription management entity 500 creates the profile based on the request and the received information; S413 "Create profile [GSMA]". Once the profile has been created the subscription management entity 500 responds to the subscription portal 300; S414 "Done [GSMA]" This message could comprise information about the created profile that is needed by the MNO for populating the subscriber database, e.g. the secret key of the profile (if it was generated by the subscription management entity 500), and activation code information. The subscription portal 300 then initiates the subscription; step S415 "Initialize subscription with UE subscriber information and information from SM-DP+". This could include using information received from the subscription management entity 500 for adding the subscription to the subscription database in the operator network. Also, billing information could be linked/copied from the subscription of the primary subscriber entity 200. The subscription portal 300 provides the AC to the primary subscriber entity 200; S416 "AC [GSMA]". The primary subscriber entity 200 triggers the secondary subscriber entity 400 to download the profile by providing the secondary subscriber entity 400 with the AC; step S417 "Trigger profile download (AC) [GSMA]". The secondary subscriber entity 400 then downloads the profile; step S418 "Profile download according GSMA specification using AC [GSMA]".

When the user selects the profile type, the new subscription is created (based on the subscription profile type selected by the user and information returned by the subscription management entity 500 and assigned to the same billable entity as the subscription used for authentication to the subscription portal 300. The subscription portal 300 requests a new subscription to be created and requests the subscription owner/billing information be copied from the subscription that has authenticated to the subscription portal 300. Alternatively and/or optionally the new subscription can be linked to the subscription of the primary subscriber entity 200, either as a separate subscription or as a separate chargeable service. This enables a single bill for all subscriptions to be issued (whilst still enabling the bill to be broken down to give per subscription details).

Embodiments where the EID of the secondary subscriber entity 400 initially is not provided to the primary subscriber entity 200 could represent scenarios where a network subscription for an unknown secondary subscriber entity 400 (or multiple network subscriptions for multiple unknown secondary subscriber entities 400) is (are) to be provided. In this respect at least the EID of the secondary subscriber entity or entities 400 is not known to the primary subscriber entity 200. In such embodiments the pairing process as in steps S401, S402, S403 would thus not occur as disclosed above. The detailed embodiment of FIG. 8 would instead start by the primary subscriber entity 200 requesting the secondary subscriber entity 400 to be provisioned, as in step S404. The profile for the secondary subscriber entity 400 is thus generated without using the EID (see above steps S412, S413) since the EID is not yet available. The profile is downloaded to the secondary subscriber entity 400 when the secondary subscriber entity 400 provides the AC, which it could receive from the primary subscriber entity 200 during a pairing process, etc. as in steps S401, S402, S403, and the EID to the subscription management entity 500.

Figure 9:
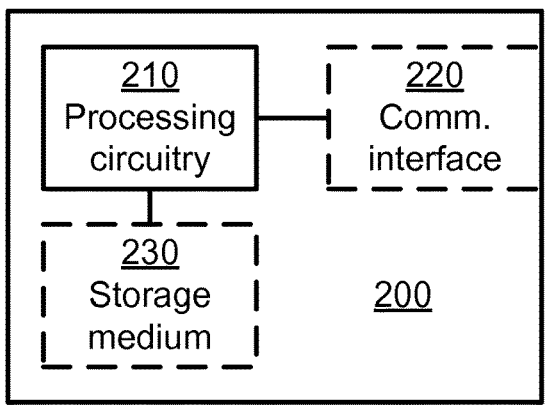
FIG. 9 is a schematic diagram showing functional units of a primary subscriber entity according to an embodiment.

FIG. 9 schematically illustrates, in terms of a number of functional units, the components of a primary subscriber entity 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1510a (as in FIG. 15), e.g. in the form of a storage medium 230. The processing circuitry 210 may further be provided as at least one application specific integrated circuit (ASIC), or field programmable gate array (FPGA).

Particularly, the processing circuitry 210 is configured to cause the primary subscriber entity 200 to perform a set of operations, or steps, S102-S110, as disclosed above. For example, the storage medium 230 may store the set of operations, and the processing circuitry 210 may be configured to retrieve the set of operations from the storage medium 230 to cause the primary subscriber entity 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The primary subscriber entity 200 may further comprise a communications interface 220 for communications with other devices and entities in the communications network 100. As such the communications interface 220 may comprise one or more transmitters and receivers, comprising analogue and digital components and a suitable number of antennas for wireless communications and ports for wireline communications.

The processing circuitry 210 controls the general operation of the primary subscriber entity 200 e.g. by sending data and control signals to the communications interface 220 and the storage medium 230, by receiving data and reports from the communications interface 220, and by retrieving data and instructions from the storage medium 230. Other components, as well as the related functionality, of the primary subscriber entity 200 are omitted in order not to obscure the concepts presented herein.

Figure 10:
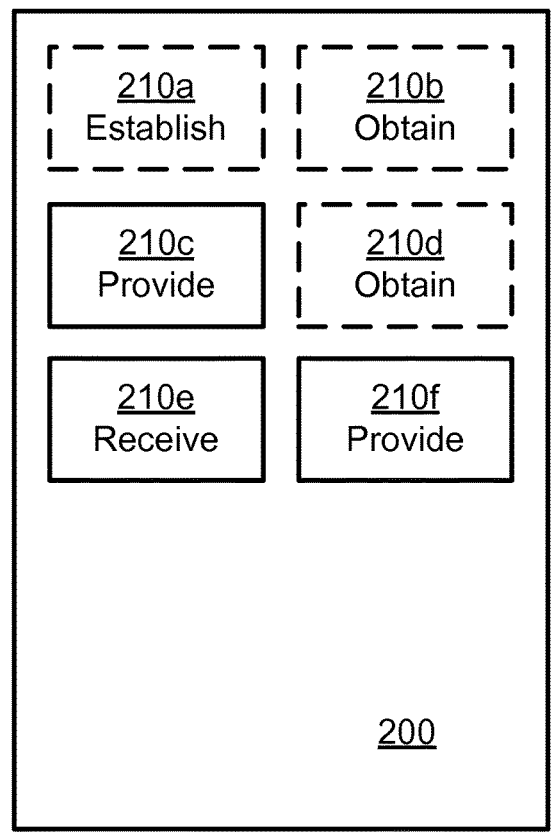
FIG. 10 is a schematic diagram showing functional modules of a primary subscriber entity according to an embodiment.

FIG. 10 schematically illustrates, in terms of a number of functional modules, the components of a primary subscriber entity 200 according to an embodiment. The primary subscriber entity 200 of FIG. 10 to comprises a number of functional modules; a provide module 210c configured to perform step S106, a receive module 210e configured to perform step S108, and a provide module 210f configured to perform step S110. The primary subscriber entity 200 of FIG. 10 may further comprise a number of optional functional modules, such as any of an establish module 210a configured to perform step S102, an obtain module 210b configured to perform step S104, and an obtain module 210d configured to perform step S106a. In general terms, each functional module 210a-210f may be implemented in hardware or in software. Preferably, one or more or all functional modules 210a-210f may be implemented by the processing circuitry 210, possibly in cooperation with functional units 220 and/or 230. The processing circuitry 210 may thus be arranged to from the storage medium 230 fetch instructions as provided by a functional module 210a-210f and to execute these instructions, thereby performing any steps of the primary subscriber entity 200 as disclosed herein.

Figure 11:
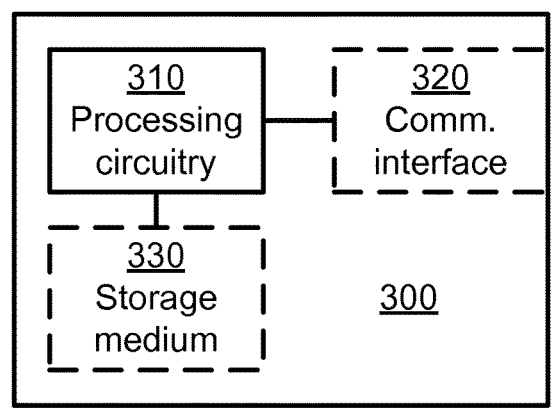
FIG. 11 is a schematic diagram showing functional units of a subscription portal according to an embodiment.

FIG. 11 schematically illustrates, in terms of a number of functional units, the components of a subscription portal 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1510b (as in FIG. 15), e.g. in the form of a storage medium 330. The processing circuitry 310 may further be provided as at least one application specific integrated circuit (ASIC), or field programmable gate array (FPGA).

Particularly, the processing circuitry 310 is configured to cause the subscription portal 300 to perform a set of operations, or steps, S202-S212, as disclosed above. For example, the storage medium 330 may store the set of operations, and the processing circuitry 310 may be configured to retrieve the set of operations from the storage medium 330 to cause the subscription portal 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The subscription portal 300 may further comprise a communications interface 320 for communications with other devices and entities in the communications network 100. As such the communications interface 320 may comprise one or more transmitters and receivers, comprising analogue and digital components and a suitable number of antennas for wireless communications and ports for wireline communications.

The processing circuitry 310 controls the general operation of the subscription portal 300 e.g. by sending data and control signals to the communications interface 320 and the storage medium 330, by receiving data and reports from the communications interface 320, and by retrieving data and instructions from the storage medium 330. Other components, as well as the related functionality, of the subscription portal 300 are omitted in order not to obscure the concepts presented herein.

Figure 12:
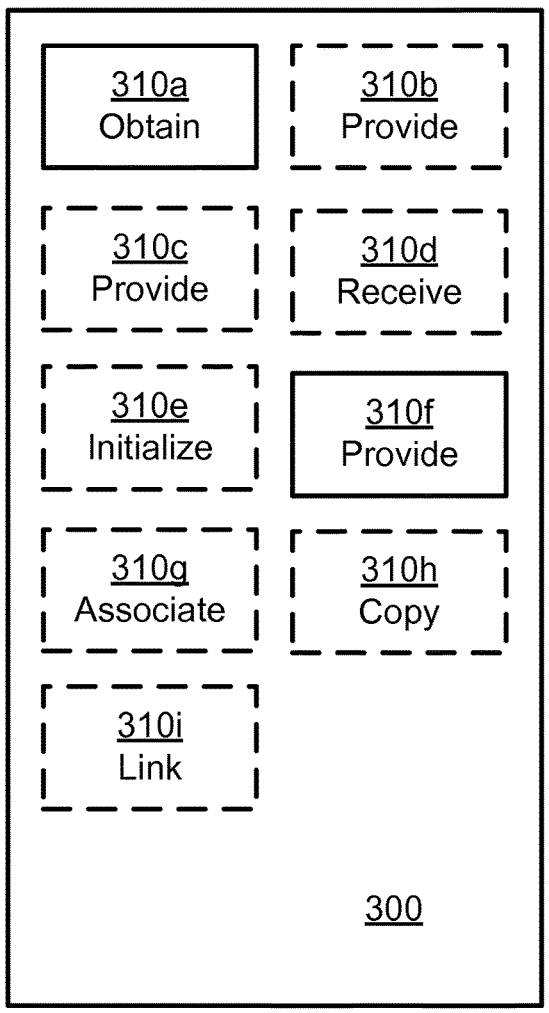
FIG. 12 is a schematic diagram showing functional modules of a subscription portal according to an embodiment.

FIG. 12 schematically illustrates, in terms of a number of functional modules, the components of a subscription portal 300 according to an embodiment. The subscription portal 300 of FIG. 12 comprises a number of functional modules; an obtain module 310a configured to perform step S202, and a provide module 310f configured to perform step S210. The subscription portal 300 of FIG. 12 may further comprise a number of optional functional modules, such as any of a provide module 310b configured to perform step S202a, a provide module 310c configured to perform step S204, a receive module 310d configured to perform step S206, an initialize module 310e configured to perform step S208, an associate module 310g configured to perform step S212, a copy module 310h configured to perform step S212a, and a link module 310i configured to perform step S212b. In general terms, each functional module 310a-310i may be implemented in hardware or in software. Preferably, one or more or all functional modules 310a-310i may be implemented by the processing circuitry 310, possibly in cooperation with functional units 320 and/or 330. The processing circuitry 310 may thus be arranged to from the storage medium 330 fetch instructions as provided by a functional module 310a-310i and to execute these instructions, thereby performing any steps of the subscription portal 300 as disclosed herein.

The subscription portal 300 may be provided as a standalone device or as a part of at least one further device. For example, the subscription portal 300 may be provided in a node of the core network. Alternatively, functionality of the subscription portal 300 may be distributed between at least two devices, or nodes. Thus, a first portion of the instructions performed by the subscription portal 300 may be executed in a first device, and a second portion of the of the instructions performed by the subscription portal 300 may be executed in a second device; the herein disclosed embodiments are not limited to any particular number of devices on which the instructions performed by the subscription portal 300 may be executed. Hence, the methods according to the herein disclosed embodiments are suitable to be performed by a subscription portal 300 residing in a cloud computational environment.

Further, although a single processing circuitry 310 is illustrated in FIG. 11 the processing circuitry 310 may be distributed among a plurality of devices, or nodes. The same applies to the functional modules 310a-310i of FIG. 12 and the computer program 1520b of FIG. 15 (see below).

Figure 13:
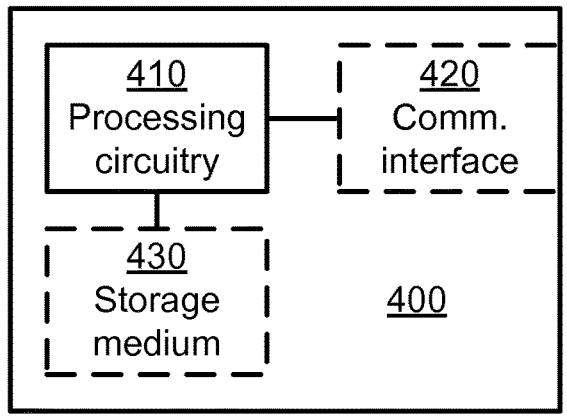
FIG. 13 is a schematic diagram showing functional units of a secondary subscriber entity according to an embodiment.

FIG. 13 schematically illustrates, in terms of a number of functional units, the components of a secondary subscriber entity 400 according to an embodiment. Processing circuitry 410 is provided using any combination of one or more of a suitable central processing unit (CPU), multiprocessor, microcontroller, digital signal processor (DSP), etc., capable of executing software instructions stored in a computer program product 410c (as in FIG. 15), e.g. in the form of a storage medium 430. The processing circuitry 410 may further be provided as at least one application specific integrated circuit (ASIC), or field programmable gate array (FPGA).

Particularly, the processing circuitry 410 is configured to cause the secondary subscriber entity 400 to perform a set of operations, or steps, S302-S304, as disclosed above. For example, the storage medium 430 may store the set of operations, and the processing circuitry 410 may be configured to retrieve the set of operations from the storage medium 430 to cause the secondary subscriber entity 400 to perform the set of operations. The set of operations may be provided as a set of executable instructions. Thus the processing circuitry 410 is thereby arranged to execute methods as herein disclosed.

The storage medium 330 may also comprise persistent storage, which, for example, can be any single one or combination of magnetic memory, optical memory, solid state memory or even remotely mounted memory.

The secondary subscriber entity 400 may further comprise a communications interface 420 for communications with other devices and entities in the communications network 100. As such the communications interface 420 may comprise one or more transmitters and receivers, comprising analogue and digital components and a suitable number of antennas for wireless communications and ports for wireline communications.

The processing circuitry 410 controls the general operation of the secondary subscriber entity 400 e.g. by sending data and control signals to the communications interface 420 and the storage medium 430, by receiving data and reports from the communications interface 420, and by retrieving data and instructions from the storage medium 430. Other components, as well as the related functionality, of the secondary subscriber entity 400 are omitted in order not to obscure the concepts presented herein.

Figure 14:
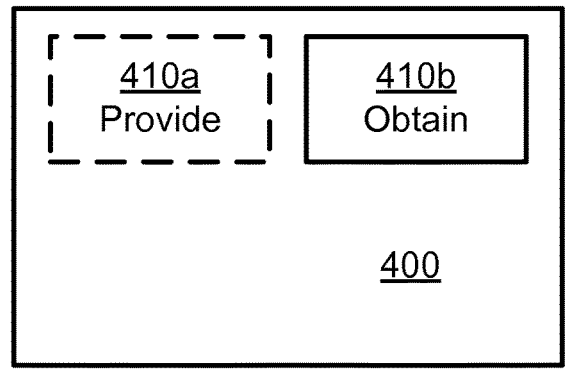
FIG. 14 is a schematic diagram showing functional modules of a secondary subscriber entity according to an embodiment.

FIG. 14 schematically illustrates, in terms of a number of functional modules, the components of a secondary subscriber entity 400 according to an embodiment. The secondary subscriber entity 400 of FIG. 14 comprises an obtain module 410b configured to perform step S304. The secondary subscriber entity 400 of FIG. 14 may further comprise a number of optional functional modules, such as a provide module 410a configured to perform step S302. In general terms, each functional module 410a-410b may be implemented in hardware or in software. Preferably, one or more or all functional modules 410a-410b may be implemented by the processing circuitry 410, possibly in cooperation with functional units 420 and/or 430. The processing circuitry 410 may thus be arranged to from the storage medium 430 fetch instructions as provided by a functional module 410a-410b and to execute these instructions, thereby performing any steps of the secondary subscriber entity 400 as disclosed herein.

Figure 15:
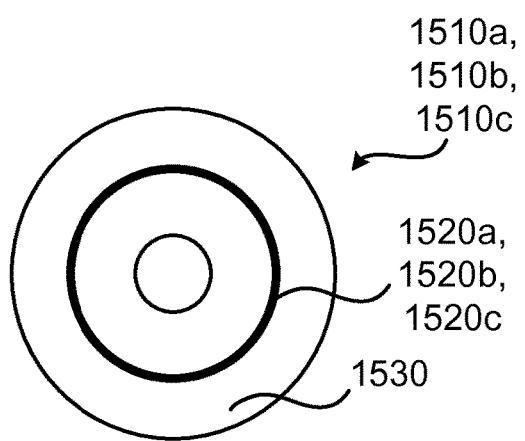
FIG. 15 shows one example of a computer program product comprising computer readable means according to an embodiment.

FIG. 15 shows one example of a computer program product 1510a, 1510b comprising computer readable means 1530. On this computer readable means 1530, a computer program 1520a can be stored, which computer program 1520a can cause the processing circuitry 210 and thereto operatively coupled entities and devices, such as the communications interface 220 and the storage medium 230, to execute methods according to embodiments described herein. The computer program 1520a and/or computer program product 1510a may thus provide means for performing any steps of the primary subscriber entity 200 as herein disclosed. On this computer readable means 1530, a computer program 1520b can be stored, which computer program 1520b can cause the processing circuitry 310 and thereto operatively coupled entities and devices, such as the communications interface 320 and the storage medium 330, to execute methods according to embodiments described herein. The computer program 1520b and/or computer program product 1510b may thus provide means for performing any steps of the subscription portal 300 as herein disclosed. On this computer readable means 1530, a computer program 1520c can be stored, which computer program 1520c can cause the processing circuitry 410 and thereto operatively coupled entities and devices, such as the communications interface 420 and the storage medium 430, to execute methods according to embodiments described herein. The computer program 1520c and/or computer program product 1510c may thus provide means for performing any steps of the secondary subscriber entity 400 as herein disclosed.

In the example of FIG. 15, the computer program product 1510a, 1510b, 1510c is illustrated as an optical disc, such as a CD (compact disc) or a DVD (digital versatile disc) or a Blu-Ray disc. The computer program product 1510a, 1510b, 1510c could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1520a, 1520b, 1520c is here schematically shown as a track on the depicted optical disk, the computer program 1520a, 1520b, 1520c can be stored in any way which is suitable for the computer program product 1510a, 1510b, 1510c.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for remote provision of a secondary subscriber entity, the method being performed by a primary subscriber entity, the method comprising:
   sending to a subscription portal an Embedded Universal Integrated Circuit Card Identity (EID) obtained from the secondary subscriber entity;
   during an authenticated session between the primary subscriber entity and the subscription portal, providing to the subscription portal a selected subscription type identifier specifying a subscription type, wherein the selected subscription type identifier is selected from said set of subscription type identifiers received in response to having sent the EID to the subscription portal;
   after providing the selected subscription type identifier to the subscription portal, receiving, from the subscription portal, an activation code for use in obtaining from a subscription management entity a subscription profile of the specified subscription type, wherein the activation code is separate and distinct from the subscription profile; and
   enabling the secondary subscriber entity to obtain the subscription profile from the subscription management entity by providing the received activation code to the secondary subscriber entity.

2. The method according to claim 1, further comprising displaying information identifying the subscription types identified by the subscription type identifiers included in the set of subscription type identifiers.

3. The method according to claim 1, wherein
   the primary subscriber entity has an existing network subscription of a first subscription type with a network operator of the subscription portal, and
      said set of subscription types is based on said first subscription type.

4. The method according to claim 3, wherein the new network subscription is to the network operator of the existing network subscription.

5. The method according to claim 1, wherein said list of subscription types is based on a subscription policy of said first subscription type.

6. The method according to claim 1, further comprising:
   establishing a further secure session with the secondary subscriber entity before obtaining the EID from the secondary subscriber entity, and wherein the EID is obtained during said further secure session.

7. The method according to claim 1, wherein the EID is obtained during a pairing process with the secondary subscriber entity.

8. A method for remote provision of a secondary subscriber entity, the method being performed by a subscription portal, the method comprising:
   obtaining, from a primary subscriber entity during an authenticated session between the primary subscriber entity and the subscription portal, a selected subscription type identifier specifying a subscription type, wherein the primary subscriber entity has an existing network subscription of a first subscription type with a network operator of the subscription portal; and
   providing, to the primary subscriber entity, an activation code for use in obtaining a subscription profile of the specified subscription type, wherein the activation code is separate and distinct from the subscription profile.

9. The method according to claim 8, wherein the new network subscription is to the network operator of the existing network subscription.

10. The method according to claim 8, wherein an Embedded Universal Integrated Circuit Card Identity (EID) of the secondary subscriber entity is obtained from the primary subscriber entity, the method further comprising:
    providing a list of subscription type identifiers to the primary subscriber entity in response to having obtained the EID, and wherein the selected subscription type identifier is selected from said list of subscription type identifiers.

11. The method according to claim 10, further comprising:
    providing the EID and information of the activation code to a subscription management entity for the subscription management entity to create the subscription profile;
    receiving a response from the subscription management entity when said subscription profile has been created; and
    initializing the new subscription using the response from the subscription management entity and information of the existing network subscription of the primary subscriber entity.

12. The method according to claim 8, further comprising: associating the new network subscription with billing information by:

copying billing information of the existing network subscription to the new network subscription; or linking billing information of the existing network subscription to the new network subscription.

13. A method for remote provision of a secondary subscriber entity, the method being performed by the secondary subscriber entity, the method comprising:

obtaining an activation code from a primary subscriber entity, wherein the activation code is associated with a profile managed by a subscription management entity, wherein the activation code is received by the primary subscriber entity from a subscription portal after providing a selected subscription type identifier to the subscription portal, wherein the selected subscription type identifier is selected from a set of subscription type identifiers received in response to having sent an Embedded Universal Integrated Circuit Card Identity (EID) obtained from the secondary subscriber entity to the subscription portal; and using the activation code to obtain the profile from the subscription management entity, wherein using the activation code to obtain the profile from the subscription management entity comprises providing the activation code to the subscription management entity.

14. A primary subscriber entity for remote provision of a secondary subscriber entity, the primary subscriber entity comprising processing circuitry, the processing circuitry being configured to cause the primary subscriber entity to:

send to a subscription portal an Embedded Universal Integrated Circuit Card Identity (EID) obtained from the secondary subscriber entity;

during an authenticated session between the primary subscriber entity and a subscription portal, provide to the subscription portal a selected subscription type identifier specifying a subscription type, wherein the selected subscription type identifier is selected from said set of subscription type identifiers received in response to having sent the EID to the subscription portal; and enable the secondary subscriber entity to obtain from a subscription management entity a subscription profile of the specified subscription type by providing to the secondary subscriber entity an activation code transmitted by the subscription portal, wherein the activation code is separate and distinct from the subscription profile.

15. A subscription portal for remote provision of a secondary subscriber entity, the subscription portal comprising processing circuitry, the processing circuitry being configured to cause the subscription portal to:

obtain, from a primary subscriber entity during an authenticated session between the primary subscriber entity and the subscription portal, a selected subscription type identifier specifying a subscription type, wherein the primary subscriber entity has an existing network subscription of a first subscription type with a network operator of the subscription portal; and provide, to the primary subscriber entity, an activation code for use in obtaining a subscription profile of the specified subscription type, wherein the activation code is separate and distinct from the subscription profile.

16. A secondary subscriber entity for remote provision of the secondary subscriber entity, the secondary subscriber entity comprising processing circuitry, the processing circuitry being configured to cause the secondary subscriber entity to:

obtain an activation code from a primary subscriber entity, wherein the activation code is associated with a profile managed by a subscription management entity, wherein the activation code is received by the primary subscriber entity from a subscription portal after providing a selected subscription type identifier to the subscription portal, wherein the selected subscription type identifier is selected from a set of subscription type identifiers received in response to having sent an Embedded Universal Integrated Circuit Card Identity (EID) obtained from the secondary subscriber entity to the subscription portal; and use the activation code to obtain the profile from the subscription management entity, wherein using the activation code to obtain the profile from the subscription management entity comprises providing the activation code to the subscription management entity.

* * * * *